US005724450A

United States Patent [19]

Chen et al.

[11] Patent Number: 5,724,450
[45] Date of Patent: Mar. 3, 1998

[54] METHOD AND SYSTEM FOR COLOR IMAGE COMPRESSION IN CONJUNCTION WITH COLOR TRANSFORMATION TECHNIQUES

[75] Inventors: Kok Chen, Sunnyvale; Michael Stokes, Cupertino, both of Calif.

[73] Assignee: Apple Computer, Inc., Cupertino, Calif.

[21] Appl. No.: 312,975

[22] Filed: Sep. 30, 1994

[51] Int. Cl.⁶ ................... G03F 3/08; G06F 15/00
[52] U.S. Cl. .......... 382/235; 382/166; 395/114; 358/518; 358/520; 358/523
[58] Field of Search ............ 358/500, 518, 358/520, 523, 524, 426, 296, 515, 529, 539, 517; 395/109; 382/166, 235; 348/642, 671, 672

[56] References Cited

U.S. PATENT DOCUMENTS

| | | | |
|---|---|---|---|
| 4,743,959 | 5/1988 | Frederiksen | 358/539 |
| 5,172,237 | 12/1992 | Blonstein et al. | 358/426 |
| 5,237,409 | 8/1993 | Yamaguchi | 358/518 |
| 5,268,753 | 12/1993 | Yamaguchi | 358/527 |
| 5,283,671 | 2/1994 | Stewart et al. | 358/532 |
| 5,416,606 | 5/1995 | Katayama et al. | 358/539 |
| 5,510,896 | 4/1996 | Wafler | 358/406 |
| 5,617,517 | 4/1997 | Chi | 395/114 |

FOREIGN PATENT DOCUMENTS 494 034   7/1992   European Pat. Off.
WO92/06557   4/1992   WIPO.

OTHER PUBLICATIONS

*International Search Report*, International Appln. No. PCT/US95/12335 Date of Mailing: 8 Feb. 1996.
"Two Bit/Pixel Full Color Encoding", Graham Campbell et al., *Computer Graphics*, vol. 20, No. 4, pp. 215–223 (1986).

*Primary Examiner*—Edward L. Coles, Sr.
*Assistant Examiner*—Kimberly A. Williams
*Attorney, Agent, or Firm*—Burns, Doane, Swecker & Mathis, L.L.P.

[57] ABSTRACT

A method and system for compressing and color transforming image data are presented. Color transformation is a process whereby perceptional differences between the expressions of images in color devices are compensated. By transforming a compressed version of the image data, the amount of time in which it takes to perform color transformation can be reduced. Selection of compression techniques which maintain color characteristics of the image data in its compressed form permits the usage of color transformation techniques which already exist for the image data in its uncompressed form. The inventive techniques can be applied either prior to, or after, storage of the image data in an intermediate media or transmission from one device to another.

20 Claims, 6 Drawing Sheets

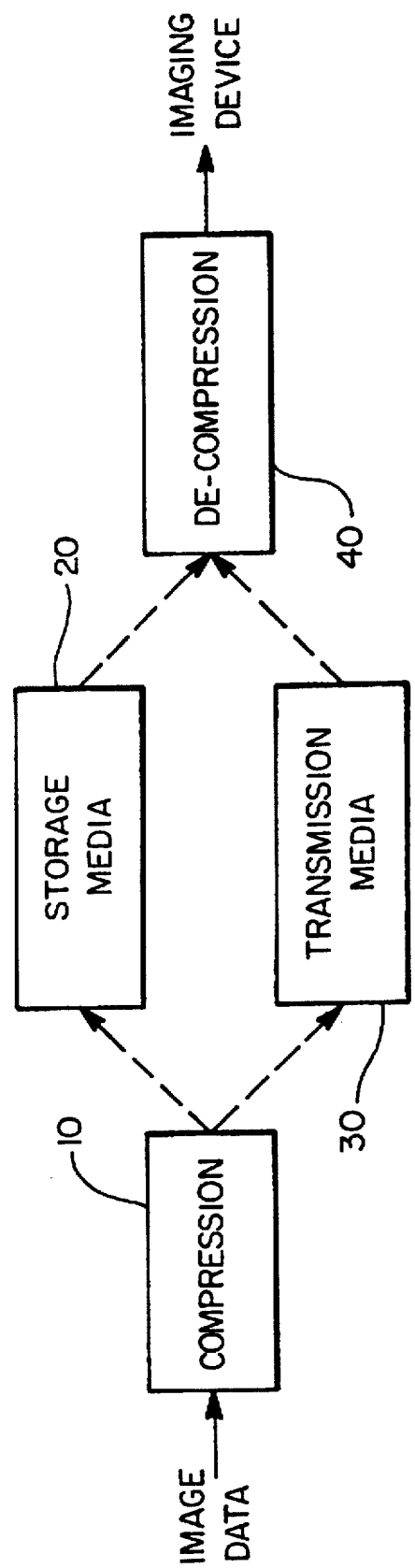

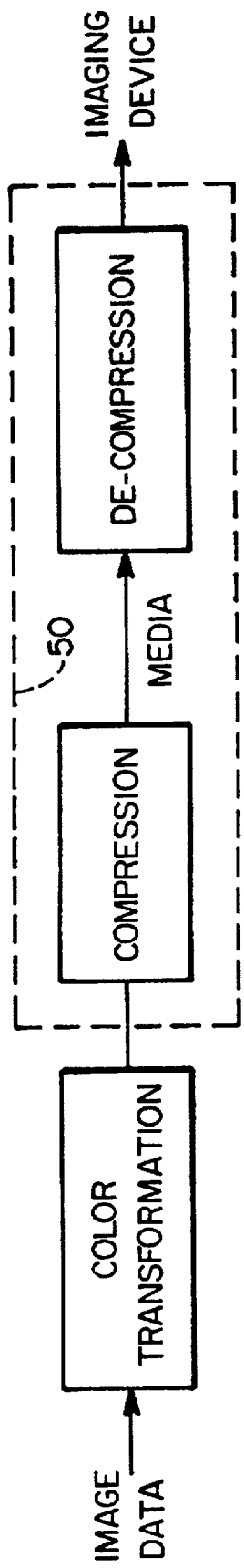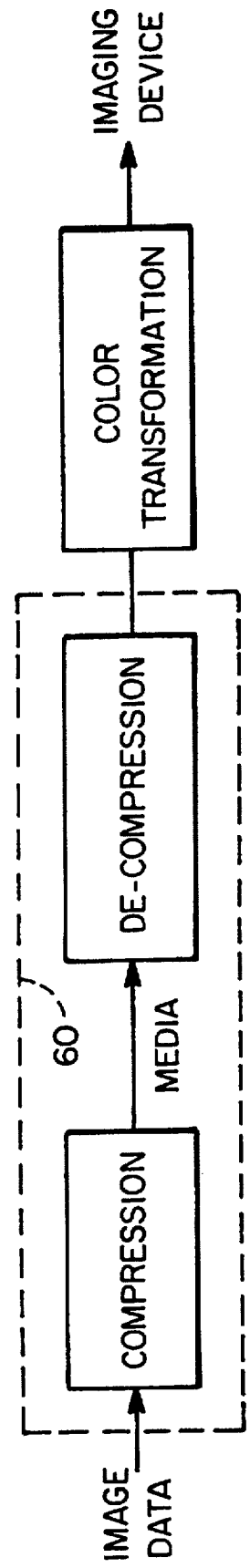
FIG_3a (PRIOR ART)
FIG_3b (PRIOR ART)

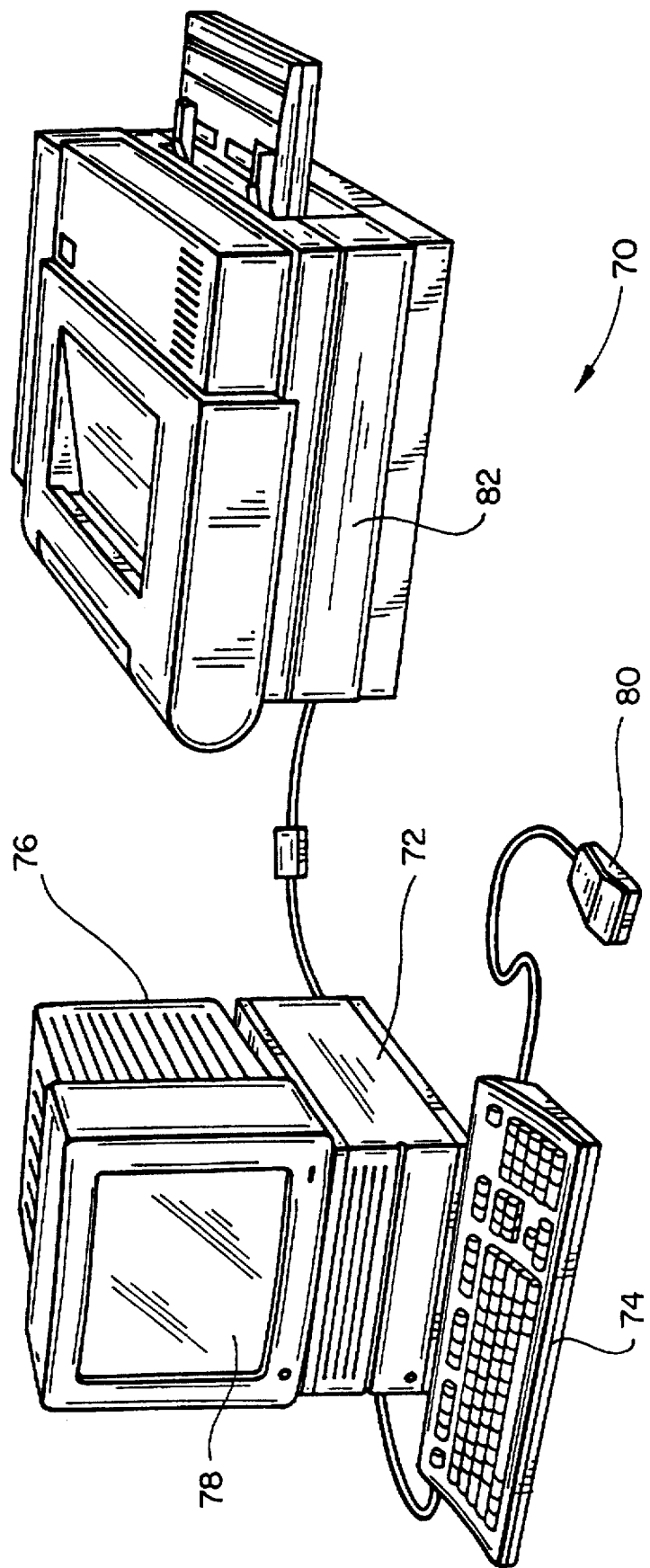
FIG_4

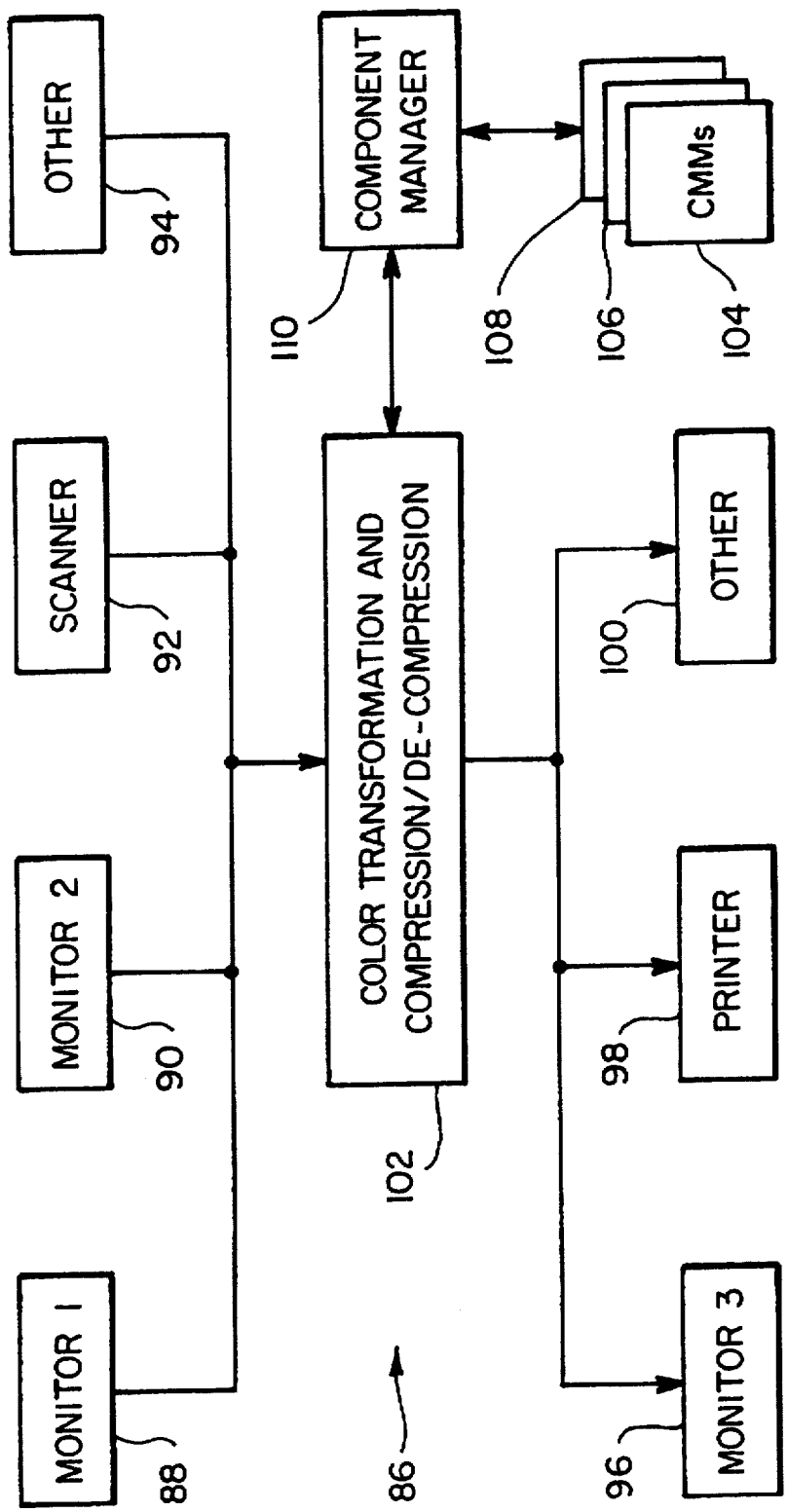
FIG_5

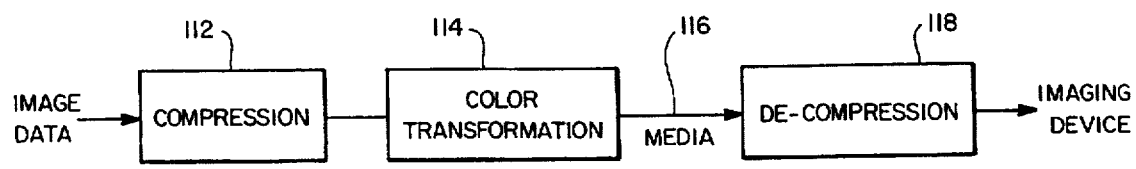
FIG_6
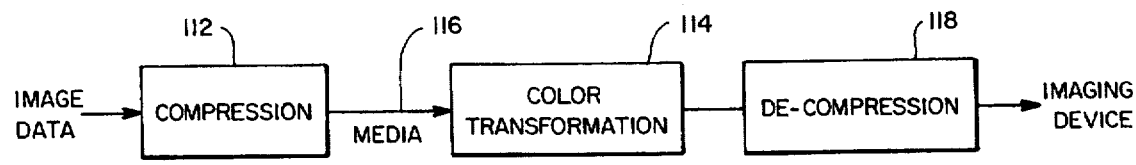
FIG_7

| Y1 U1 V1 | Y2 U2 V2 | Y3 U3 V3 |
|---|---|---|
| Y4 U4 V4 | Y5 U5 V5 | Y6 U6 V6 |
| Y7 U7 V7 | Y8 U8 V8 | Y9 U9 V9 |

*FIG_8a*

| Y1 U1 V1 | Y2 | Y3 U3 V3 |
|---|---|---|
| Y4 | Y5 | Y6 |
| Y7 U7 V7 | Y8 | Y9 U9 V9 |

*FIG_8b*

| Y1' U1' V1' | Y2' | Y3' U3' V3' |
|---|---|---|
| Y4' | Y5' | Y6' |
| Y7' U7' V7' | Y8' | Y9' U9' V9' |

*FIG_8c*

METHOD AND SYSTEM FOR COLOR IMAGE COMPRESSION IN CONJUNCTION WITH COLOR TRANSFORMATION TECHNIQUES

BACKGROUND

The present invention relates in general to computer systems, and in particular to peripheral devices used in computer systems. Still more particularly, the present invention relates to methods and systems for providing color modeling techniques in conjunction with image compression.

As computing moves into the multimedia era, the days in which color was an unneeded luxury and monochrome monitors were commonplace, have given way to color image processing being an integral feature used by most applications. As the commercial demand for color grew, so too did the complexity of the hardware and software which was designed in response to that demand. Many color image processing techniques have been developed to deal with the issues raised by the integration of color into the computing paradigm.

Color transformation is one such technique, which is used when transferring color images and documents between color devices, such as monitors, scanners and printers. Color transformation is a useful interface technique because color devices have different color capabilities, describe color in different terms and operate in different color spaces. For example, a color display monitor in a computer system may create and describe colors in terms of red, green and blue ("rgb") values, and is then said to work in the RGB color space. The rgb values for this display monitor are device dependent, meaning the rgb values are particular for that monitor or brand of monitor. Because the rgb values are device dependent, colors displayed on different monitors will probably not be visually identical even for the same rgb values.

Most printers create and describe colors in device dependent terms differing from monitors. Printers use, for example, cyan, magenta, yellow and black ("cmyk") values to describe colors, and are said to work in the CMYK color space. Again, because the cmyk values are device dependent, colors printed on any given printer will probably not match colors printed on a different printer for the same cmyk values.

Further complicating color transformation between color devices is that different color devices have different color capabilities. Every color device, such as a scanner, printer, or monitor, has a range of colors that it can produce. This range of producible colors is known as a gamut. Those skilled in the art will recognize that color display monitors can produce and display hundreds to thousands of colors. Color printers, however, typically have a smaller number of printable colors. Consequently, in most situations the gamut for a color display monitor exceeds the gamut for a color printer. As a result some colors displayed on display monitors cannot be produced by color printers.

Color transformation models convert colors between devices while trying to maintain the perceived color appearance. For example, a user might create an original image on a display monitor. If she or he prints this image without any color transformation, the color appearance of the printed image may differ significantly from that of the displayed image. Using a color transformation model, this change can be reduced to a perceptionally acceptable level.

Thus, to maintain color fidelity, a color imaging output system (e.g. a display, a printer, etc.) transforms the color image data before the data is applied to the output apparatus, as is generally illustrated by the block diagram of FIG. 1. However, most color imaging systems work with an enormous amount of data. Therefore, the storage of color image data, and/or the transmission of the color image data, usually occurs only after data compression has been performed on the original image data, as represented by block 10 of FIG. 2. After compression, the data is expressed in a suitable intermediate format which is both smaller than the original volume of data and which can also be expanded into image data that is exactly the same as, or differs only slightly from, the original image data.

This compressed data is then either stored in the intermediate format in storage media 20, transmitted in the intermediate format through a transmission media 30, or both stored in the storage device 20 and transmitted through the data transmission media 30. Before being sent to the output apparatus, the compressed data is decompressed by applying the inverse of the compression process at block 40.

Conventional systems which apply both compression and color transformation either apply the color transformation before the compression-decompression, as shown in FIG. 3(a), or apply the color transformation after the compression-decompression, as shown in FIG. 3(b). Note that in both FIG. 3(a) and FIG. 3(b) the compression-decompression device is treated as an inseparable, contiguous apparatus, as indicated by the dotted boxes 50 and 60 in the two figures, respectively. The color transformation is applied either before the compression, as in FIG. 3(a), or after the de-compression as, in FIG. 3(b). One problem with conventional color imaging systems, such as those illustrated in FIGS. 3(a) and 3(b), is that the color transformation process can be very slow taking, for example two minutes or more, due to the complexity of the matrix calculations used in the color models. Accordingly, it would be desirable to reduce the amount of time needed to perform color transformation without sacrificing perceptional quality.

SUMMARY

The present invention applies color transformation within the compression-decompression apparatus, i.e., by applying color transformation to the compressed image data instead of applying color transformation to either the original uncompressed image data, or the resultant decompressed data. In this way color transformation is applied to much less data than in conventional systems, thereby speeding up the process significantly. Compression techniques are selected which maintain color fidelity, so that the color transformation is accurate.

BRIEF DESCRIPTION OF THE DRAWINGS

The features believed characteristic of the invention are set forth in the appended claims. The invention itself, however, as well as an exemplary mode of use, and further objects and advantages thereof, will best be understood by reference to the following detailed description of an illustrative embodiment when read in conjunction with the accompanying drawings, wherein:

FIG. 1 illustrates the role of color transformation in conventional imaging systems;

FIG. 2 illustrates the role of data compression in conventional image systems;

FIG. 3(a) is a block diagram illustrating one conventional combination of color transformation and data compression;

FIG. 3(b) is a block diagram illustrating a second conventional combination of color transformation and data compression;

FIG. 4 is an exemplary computer system which can be used in conjunction with the present invention;

FIG. 5 is a block diagram which illustrates the architecture of a color processing system according to the present invention;

FIG. 6 is a block diagram illustrating an exemplary embodiment of the present invention;

FIG. 7 is a block diagram illustrating another exemplary embodiment of the present invention; and FIGS. 8(a)–8(c) are pixel representations used to describe yet another exemplary embodiment of the present invention.

DETAILED DESCRIPTION

With reference now to the figures and in particular with reference to FIG. 4, a computer system is illustrated which may be used in conjunction with methods and systems for compressing and transforming color image data according to the present invention. Computer system 70 includes a computer 72, keyboard 74, a color display monitor 76 having a display screen 78, a cursor control device 80, shown here as a mouse, and a printer 82. Computer system 70 may be implemented using any suitable computer, such as a Macintosh Quadra™ computer, a product of Apple Computer, Incorporated, located in Cupertino, Calif. Printer 82 can be any color printer, such as a Color Stylewriter Pro™ printer also a product of Apple Computer, Incorporated.

Referring to FIG. 5, a block diagram illustrates the architecture of a color processing system according to an exemplary embodiment of the present invention. Color processing system 86 may include a plurality of source devices such as first display monitor 8.8, second display monitor 90, scanner 92, and other device 94. Other device 94 may be other real or virtual devices, such as a camera or color composition routines. Each of these source devices is a color device that can be added to or removed from color processing system 86. Source devices 88, 90, 92, 94 are examples of color devices that can provide color information to or receive color information from within color processing system 86 and those skilled in the art will appreciate that any other such color devices can also be interfaced with color system 86.

Color processing system 86 may also include a plurality of destination devices such as third display monitor 96, color printer 98, and other device 100. Other device 40 may be other real or virtual devices, such as a plotter or color composition routines. Like source devices 88, 90, 92, 94, each of the destination devices is a color device that can be added to or removed from color processing system 86. Destination devices 96, 98, 100 are examples of color devices that can provide color information to or receive color information from within color processing system 86.

Block 102 represents a color utility which can include a set of routines and data structures that enable color processing system 86 to match or transform colors and communicate color information between the various source and destination devices. An example of such a utility is the Apple™ ColorSync™ Utility. Compression and decompression of the image data can also be provided, for example as illustrated and described below with respect to FIGS. 6 and 7. Color information is transmitted between devices via a color profile. A color profile is a data structure that describes the basic color characteristics of the device. Color information described in a color profile includes data relating to the device's color space, gamut, tonal reproduction curves, and the preferred color matching model (CMM).

A CMM is a component of color processing system 86. Color processing system 86 may have one or more CMMs.

Blocks 104, 106, 108 represent three different CMMs within color processing system 86. One of the CMMs in color processing system 86 is typically a default, for example the Apple™ Color transformation Method included with ColorSync™. A CMM is where the conversion, or color transformation, between differing color gamuts occurs. As described earlier, color transformation matches the colors of the source color profile to the colors of the destination color profile.

To perform color transformation in color processing system 86, the utility 102 calls one or more CMMs 104, 106, 108 via component manager 110. The color transformation process will be described by way of example. Suppose that a color image displayed on first display monitor 88 is to be printed on printer 98, and the user wants color transformation to occur. The application or device driver (not shown) for first display monitor 88 calls the utility 102 and transmits the color profile of first display monitor 88. The color profile for first display monitor 88 is the source color profile. The utility 102 also obtains the color profile from the device driver (not shown) for printer 98. The color profile for printer 98 is the destination color profile.

The utility 102 then transfers the color profiles for first display monitor 88 and printer 98 to component manager 110. Component manager 110 examines the source and destination color profiles and calls one or more CMMs to perform color transformation. How many CMMs are called depends upon whether or not the source color profile and the destination color profile can use the same CMM for color transformation. Once color transformation is completed, the color image is printed on printer 98.

As mentioned earlier, according to the present invention color transformation is performed after the original image data is compressed, and before decompression of the compressed data occurs, to reduce the amount of data to be transformed. According to exemplary embodiments of the present invention, the compression techniques which are selected for integration with the color transformation process are those in which the color information of the image is maintained in the compressed data. In this way, the same color transformation process which would be applied to uncompressed data, can also be used for the purposes of the present invention for application to compressed data. Although specific details of color transformation processes are not germane to the present discussion, the interested reader is directed to U.S. patent application Ser. No. 08/304,844, filed on Sep. 13, 1994 entitled "Method and System for Automatically Generating Printer Profiles" which disclosure is incorporated here by reference.

FIG. 6 illustrates one exemplary implementation of the present invention. Therein, the original image data is first compressed at block 112. Instead of applying the compressed data directly to the intermediate media, the compressed data is first passed through color transformation device 114 which, for example, color transforms the compressed data in the same way in which the desired color transformation would have acted upon uncompressed data as described above.

This compressed, color transformed data is now applied to whatever intermediate media 116 that is desired, examples of which include storage apparatuses, data transmission devices, frame buffers or any combination of the above. The compressed data is later retrieved from the intermediate media 116 and decompressed at block 118 to provide uncompressed, color-transformed data to an imaging device. As an alternative to storage in an intermediate media, the compressed, color-transformed data could be transmitted, e.g., through a system, over a network, etc., to an imaging device where decompression occurs.

FIG. 7 shows another exemplary overview of the present invention wherein the reference numerals used in FIG. 6 are re-used to denote similar structures. In this case, the color transformation 114 is applied after the compressed data has passed through the intermediate media 116. Note that the data is still in compressed form prior to color transformation, but the transformation is applied after data has been fetched from the intermediate media or after the data has been transmitted.

Having described the present invention in general terms, a more detailed, exemplary embodiment will now be described to illustrate how the present invention results, among other advantages, in more rapid color transformation. This exemplary embodiment is described in terms of compressing image data in the YUV and RGB color spaces. However, those skilled in the art will appreciate that the present invention is applicable to any types of data compression in which there is either no effect of the compression technique on the color information, or that effect is known, so that color transformation can be properly performed. For example, the compression techniques disclosed in the article entitled "Two BitiPixel Full Color Encoding" authored by Graham Campbell et al., published in *Computer Graphics Journal*, Vol. 20, No. 4, 1986, pp.215–223, could be used to implement the present invention, which disclosure is incorporated here by reference.

For the purposes of the following description, a color pixel is a vector which contains more than one component of color. A color image is a two dimensional object including a plurality of color pixels.

In this exemplary embodiment, a pixel in the color image is described by three color components, specifically red, green and blue components, and a destination image output device which also accepts color pixels with the same three components, red (R), green (G) and blue (B) is the envisioned recipient of the decompressed, color-transformed data. For example, data input to the system via any one of devices 88–94 and output via display 96 could be processed as follows.

For this embodiment, each image pixel is converted from the RGB color space into the YUV color space, defined by the equations:

$$Y=0.114B+0.587G+0.299R$$

$$U=0.493(B-Y)$$

$$V=0.877(R-Y)$$

The YUV color space is a three component color space which expresses images in terms of one luminance channel (the Y value) and two chrominance channels (the U and V values). This color space is used, for example, in image processing associated with television. Based on user survey information gathered during the development of television systems, it became well known to those skilled in the art that as much as three-quarters of the U and V data can be eliminated without perceptibly impacting the resultant image. Thus, according to this exemplary compression technique, the full set of YUV values for each pixel are preserved for only about one-quarter of the pixels in the image. For the remaining pixels, the exact values are maintained only for the luminance channel Y, the U and V values for those remaining pixels are assumed to be the same as those found in their neighboring pixels. This compression technique will be described in more detail in conjunction with FIGS. 8(a)–8(b).

FIG. 8(a) illustrates a block of pixels (1–9) each of which is represented by a particular YUV value (i.e., Y1U1V1, Y2U2V2, etc.) which has been determined by inserting the known rgb values into the above-described equations. Note that each pixel has its own unique set of YUV values. However, as described above, some of the U and V values can be dispensed with in order to compress the data. This is illustrated conceptually in FIG. 8(b). Note therein that the pixel representations for all but the corner pixels are shown as having the U and V values dropped. These U and V values can be assumed to be those found in an adjacent pixel or an interpolation of U and V values in adjacent pixels.

Note that in compressing the data from FIG. 8(a) to FIG. 8(b), the color vectors have not been changed. That is, the color information used to express the pixels, e.g., pixel 1 (Y1U1V1), remains unaltered. Instead, data which is not needed to obtain a visually acceptable reproduction has been omitted. Thus, when applying color transformation to the compressed pixels in FIG. 8(b), the same color transformation technique can be used on these pixels as could also be used on the uncompressed pixels found in FIG. 8(a) since the color vectors remain unchanged. This is illustrated in FIG. 8(c) wherein the primes denote color-transformed values.

Also note that the transformations which are performed for pixels 2, 4, 5, 6 and 8 involve only a one-dimensional transformation, since only the Y values remain. Such one dimensional transformations require far less time than the three-dimensional transformations which were previously required in conventional systems that transformed each three component value for each pixel. According to this exemplary embodiment of the present invention, a data compression ratio of 2:1 is achieved which translates into roughly the same magnitude increase in the rate of speed of the color transformation process.

While the foregoing exemplary embodiment has been described in terms of the YUV color space, those skilled in the art will appreciate that any color space and compression technique in which the color vector is maintained, or at least the change in color vector is understood, can be used to implement the present invention. Moreover, although this exemplary embodiment is described in terms of a color space having three components which are used to describe a color pixel, the present invention is also applicable to color spaces in which more or fewer components are used to express a color pixel.

The present invention is also applicable to both image input devices, such as digital scanners and digital cameras, as well as digital output devices. Moreover, the present invention can be applied when transferring digital images between two digital computers.

The above-described exemplary embodiments are intended to be illustrative in all respects, rather than restrictive, of the present invention. Thus, the present invention is capable of many variations in detailed implementation that can be derived from the description contained herein by a person skilled in the art. All such variations and modifications are considered to be within the scope and spirit of the present invention as defined by the following claims.

What is claimed is:

1. A method for processing color image data comprising the steps of:

compressing said color image data to generate compressed color image data, wherein said compressed color image data can be stored using less storage space than said color image data, and wherein said compressed color image data retains color information associated with said color image data;

color transforming said compressed color image data to generate compressed, color transformed color image data; and decompressing said compressed, color transformed color image data to generate transformed color image data suitable for use with a particular color image rendering device.

2. The method of claim 1 further comprising the steps of:

storing said compressed color image data in an intermediate media; and retrieving said compressed color image data from said intermediate media prior to color transforming said compressed color image data.

3. The method of claim 1 further comprising the steps of:

storing said compressed, color transformed color image data in an intermediate media; and retrieving said compressed, color transformed color image data prior to said step of decompressing said compressed, color transformed color image data.

4. The method of claim 1, wherein said color image data is suitable for use with a first particular color image rendering device and said transformed color image data is suitable for use with a second particular color image rendering device.

5. The method of claim 4, wherein said first particular color image rendering device is a color monitor and said second particular color image rendering device is a color printer.

6. The method of claim 1, wherein said step of compressing said color image data comprises the step of converting RGB color image data to YUV color image data.

7. The method of claim 1, wherein said color image data describes a plurality of color image pixels, and wherein said step of compressing said color image data comprises the step of color encoding said color image data using two bits to define each of said color image pixels.

8. An apparatus for processing color image data comprising:

means for compressing said color image data to generate compressed color image data, wherein said compressed color image data can be stored using less storage space than said color image data, and wherein said compressed color image data retains color information associated with said color image data;

means for color transforming said compressed color image data to generate compressed, color transformed color image data; and means for decompressing said compressed, color transformed color image data to generate transformed color image data suitable for use with a particular color image rendering device.

9. The apparatus of claim 8 further comprising:

means for storing said compressed color image data in an intermediate media; and means for retrieving said compressed color image data from said intermediate media prior to color transforming said compressed color image data.

10. The apparatus of claim 8 further comprising:

means for storing said compressed, color transformed color image data in an intermediate media; and means for retrieving said compressed, color transformed color image data prior to said step of decompressing said compressed, color transformed color image data.

11. The apparatus of claim 8, wherein said color image data describes a plurality of color image pixels, and wherein said means for compressing said color image data comprises means for color encoding said color image data using two bits to define each of said color image pixels.

12. The apparatus of claim 8, wherein said color image data is suitable for use with a first particular color image rendering device and said transformed color image data is suitable for use with a second particular color image rendering device.

13. The apparatus of claim 12, wherein said first particular color image rendering device is a color monitor and said second particular color image rendering device is a color printer.

14. The apparatus of claim 8, wherein said means for compressing said color image data comprises means for converting RGB color image data to YUV color image data.

15. A color image processing system comprising:

a color image input device which generates an image comprising a plurality of pixels;

a compression device which receives said plurality of pixels and reduces an amount of data used to express said pixels while maintaining color characteristics of said pixels;

a color transformation device for transforming said compressed data from a color space associated with said color image input device into a color space associated with a color image output device; and a decompression device for receiving an output of said color transformation device and providing decompressed, transformed image data to said color image output device.

16. The system of claim 15, wherein said compression device converts RGB image data to YUV image data.

17. The system of claim 15, wherein said color transformation device performs color matching between said color image input device and said color image output device.

18. The system of claim 15, wherein said color image input device is one of a color image scanner and a color image digital camera.

19. The system of claim 15, wherein said color image output device is one of a color image display monitor and a color image printer.

20. A method for performing color matching between color image devices in a computing system, comprising the steps of:

receiving a first color image which is compatible with a first color image device;

compressing said first color image to produce a compressed color image, wherein said compressed color image can be stored using less storage space than said first color image, and wherein said compressed color image includes color information associated with said first color image;

transforming said compressed color image, using a color matching model associated with a second color image device, to produce a transformed color image; and decompressing said transformed color image data to produce a second color image which is compatible with said second color image device.

* * * * *